(12) United States Patent
Wang et al.

(10) Patent No.: US 9,166,444 B2
(45) Date of Patent: Oct. 20, 2015

(54) CONTROL CIRCUIT AND MOTOR DEVICE

(75) Inventors: En Hui Wang, Shenzhen (CN); Fei Xin, Shenzhen (CN); Chi Ping Sun, Hong Kong (CN); Ming Li Zhang, Shenzhen (CN)

(73) Assignee: JOHNSON ELECTRIC S.A., Murten (CH)

( * ) Notice: Subject to any disclaimer, the term of this patent is extended or adjusted under 35 U.S.C. 154(b) by 1214 days.

(21) Appl. No.: 13/072,110

(22) Filed: Mar. 25, 2011

(65) Prior Publication Data

US 2011/0235218 A1    Sep. 29, 2011

(30) Foreign Application Priority Data

Mar. 26, 2010    (CN) .................. 2010 1 0138038

(51) Int. Cl.
| | | |
|---|---|---|
| H02H 7/00 | (2006.01) | |
| H02J 7/34 | (2006.01) | |
| H02M 1/32 | (2007.01) | |
| H02M 3/335 | (2006.01) | |
| H02H 7/10 | (2006.01) | |

(52) U.S. Cl.
CPC ................. *H02J 7/345* (2013.01); *H02M 1/32* (2013.01); *H02H 7/10* (2013.01); *H02M 3/33507* (2013.01)

(58) Field of Classification Search
USPC ......................................................... 361/18
See application file for complete search history.

(56) References Cited

U.S. PATENT DOCUMENTS

| | | | |
|---|---|---|---|
| 3,582,713 A * | 6/1971 | Till ................................ 361/79 |
| 3,989,995 A * | 11/1976 | Peterson ........................ 363/19 |
| 4,751,451 A * | 6/1988 | Vincent ......................... 318/814 |
| 5,615,097 A | 3/1997 | Cross | |
| 5,708,574 A | 1/1998 | Crompton | |
| 5,808,847 A * | 9/1998 | Ferrazzi ....................... 361/93.9 |
| 6,028,755 A * | 2/2000 | Saeki et al. .................. 361/91.1 |
| 6,246,562 B1 * | 6/2001 | Durif ............................ 361/154 |
| 6,359,796 B2 * | 3/2002 | Hartular et al. ................. 363/50 |
| 6,608,405 B1 * | 8/2003 | Zakharian .................... 307/109 |
| 7,102,326 B1 * | 9/2006 | Chen et al. .................... 318/807 |
| 8,102,679 B2 * | 1/2012 | Gong et al. ................. 363/21.12 |
| 2003/0107359 A1 * | 6/2003 | Balakrishnan et al. ....... 323/299 |
| 2003/0142516 A1 * | 7/2003 | Noon et al. ................. 363/21.17 |
| 2003/0151870 A1 * | 8/2003 | Gronbach et al. ........... 361/91.1 |
| 2007/0152648 A1 * | 7/2007 | Gabello et al. .............. 323/288 |
| 2007/0170900 A1 | 7/2007 | Lee | |
| 2008/0007891 A1 * | 1/2008 | Doljack ........................ 361/502 |
| 2009/0310389 A1 * | 12/2009 | Balakrishnan et al. .... 363/21.15 |
| 2010/0039836 A1 * | 2/2010 | Gong et al. ................. 363/21.13 |
| 2010/0066290 A1 | 3/2010 | Ting | |
| 2010/0123978 A1 * | 5/2010 | Lin et al. ........................ 361/18 |
| 2011/0305047 A1 * | 12/2011 | Jungreis et al. ............. 363/21.02 |

(Continued)

FOREIGN PATENT DOCUMENTS

| | | |
|---|---|---|
| CN | 1592020 A | 3/2005 |
| JP | 11-215880 A | 8/1999 |

*Primary Examiner* — Ronald W Leja

(74) *Attorney, Agent, or Firm* — Muncy, Geissler, Olds & Lowe, P.C.

(57) ABSTRACT

A control circuit has an input terminal for receiving an input voltage, an energy accumulator for storing electric energy from the input terminal and supplying power to an electrical load, and an over-voltage protection unit for lowering the voltage at the input terminal when the voltage at an output terminal of the energy accumulator exceeds a predetermined threshold value. A motor device combines the control circuit with an electric motor as the load.

13 Claims, 1 Drawing Sheet

(56) References Cited

U.S. PATENT DOCUMENTS

2014/0043875 A1\* 2/2014 Hsing et al. .................. 363/77
2014/0334047 A1\* 11/2014 Ahn ............................... 361/56

\* cited by examiner

CONTROL CIRCUIT AND MOTOR DEVICE

CROSS REFERENCE TO RELATED APPLICATIONS

This non-provisional patent application claims priority under 35 U.S.C. §119(a) from Patent Application No. 201010138038.7 filed in The People's Republic of China on Mar. 26, 2010.

FIELD OF THE INVENTION

This invention relates to an electrical power supply and in particular, to a power supply having over-voltage protection.

BACKGROUND OF THE INVENTION

A known control circuit for a fan powered by an AC mains voltage and driven by a DC motor uses a capacitor to decrease the AC mains voltage, and a rectifier for rectifying the decreased AC voltage to a DC voltage. When the load is small or capacitance of the capacitor is large, the output voltage of the rectifier will increase, which could possibly damage electronic components powered by the rectifier.

SUMMARY OF THE INVENTION

Hence there is a desire for a control circuit providing over-voltage protection for a power supply.

Accordingly, in one aspect thereof, the present invention provides a control circuit comprising: an input terminal for receiving an input voltage; an energy accumulator for storing electric energy from the input terminal and supplying power to an electrical load; and an over-voltage protection unit for lowering the voltage at the input terminal when the voltage at an output terminal of the energy accumulator exceeds a predetermined threshold value.

Preferably, a first switching unit is arranged between the input terminal and the energy accumulator and is configured to be conductive to electrically connect the input terminal to the energy accumulator when the voltage at the output terminal of the energy accumulator is lower than the threshold value and to be non-conductive to electrically disconnect the input terminal from the energy accumulator when the voltage at the output terminal of the energy accumulator exceeds the threshold value.

Preferably, the first switching unit is a diode, the anode of which is electrically connected to the input terminal.

Preferably, the over-voltage protecting unit comprises: a detecting unit which is configured to detect the voltage at the output terminal of the energy accumulator and produce a detecting signal indicating whether the detected voltage exceeds the threshold value; a second switching unit which is electrically connected between the input terminal and a voltage less than the threshold value and is configured to be conductive when the detecting signal indicates the detected voltage exceeds the threshold value and to be non-conductive when the detecting signal indicates the detected voltage is lower than the threshold value.

Preferably, the second switching unit is electrically connected between the input terminal and a ground voltage.

Preferably, the predetermined threshold value is essentially equal to the nominal voltage at the input terminal.

Preferably, the control circuit includes a converter for converting an AC voltage to a DC voltage to be supplied to the input terminal.

Preferably, a voltage decreasing unit is provided for decreasing a higher AC voltage to a lower AC voltage to be converted by the converter. Preferably, the voltage decreasing unit comprises an adjustable capacitor unit with adjustable capacitance.

Preferably, the energy accumulator comprises a capacitor.

According to a second aspect, the present invention provides a motor device comprising a motor and incorporating a control circuit as described above, to supply power to the motor. Preferably, the motor is a brushless direct current motor.

Advantages of embodiments of the present invention include that the reliability of the circuit is high and the circuit cost is low. Besides, the speed of the motor can be easily adjusted.

BRIEF DESCRIPTION OF THE DRAWINGS

A preferred embodiment of the invention will now be described, by way of example only, with reference to figures of the accompanying drawings. In the figures, identical structures, elements or parts that appear in more than one figure are generally labelled with a same reference numeral in all the figures in which they appear. Dimensions of components and features shown in the figures are generally chosen for convenience and clarity of presentation and are not necessarily shown to scale. The figures are listed below.

DETAILED DESCRIPTION OF THE PREFERRED EMBODIMENT

Figure 1:
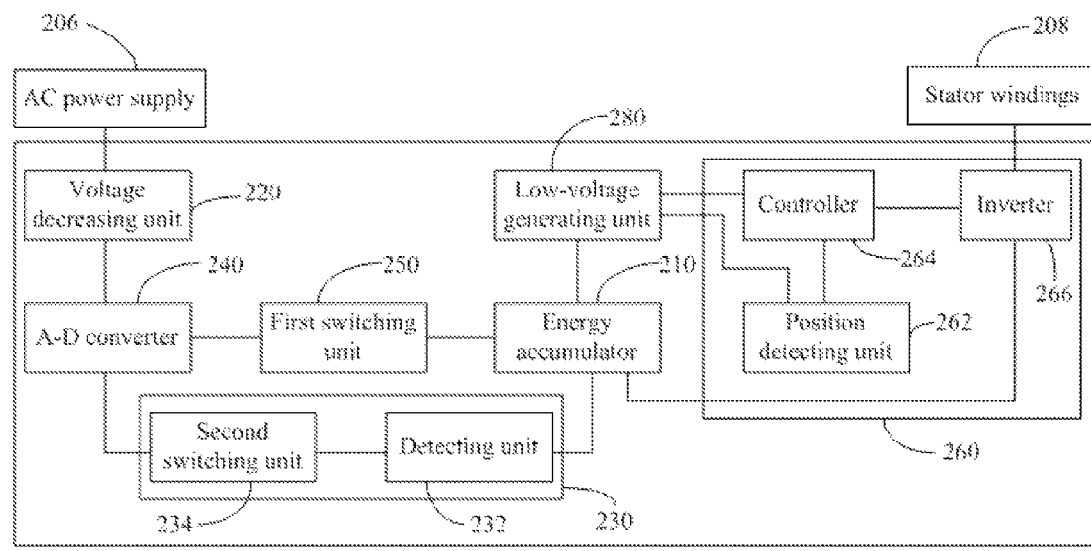
FIG. 1 is a block diagram of a control circuit in accordance with the preferred embodiment of the present invention.

A control circuit 204, in accordance with the preferred embodiment of the present invention, is used for controlling a single phase brushless DC motor having a permanent magnet rotor and a stator with stator windings 208. The stator windings represent an electrical load. The control circuit 204 is powered by an AC power supply 206 and comprises a voltage decreasing unit 220, an A-D converter 240, an energy accumulator 210, a driving unit 260, a low-voltage generating unit 280, an over-voltage protecting unit 230, and a first switching unit 250.

Figure 2:
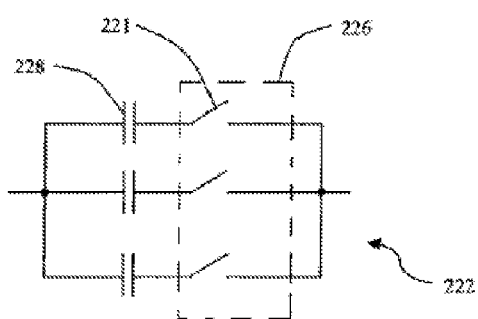
FIG. 2 shows a voltage decreasing unit of the control circuit in FIG. 1.

The voltage decreasing unit 220 comprises an adjustable capacitor unit 222 (FIG. 2) with adjustable capacitance for decreasing an AC voltage output from the AC power supply 206. The adjustable capacitor unit 222 is electrically connected between the AC power supply 206 and the A-D converter 240. The adjustable capacitor unit comprises at least two fixed capacitors 228 with fixed capacitance and a control unit 226 for respectively and selectively, electrically connecting the at least two fixed capacitors 228 between the AC power supply 206 and the A-D converter. The control unit 226 comprises at least two switches 221 which are respectively electrically connected in series with the at least two fixed capacitors 228. Each switch 221 and a corresponding capacitor 228 form a switching capacitor and the at least two switching capacitors are electrically connected in parallel with each other. When a switch 221 is closed or conductive, its corresponding capacitor 228 is electrically connected between the AC power supply and the A-D converter. When a switch 221 is open or non-conductive, its corresponding capacitor 228 is electrically disconnected from the circuit with the AC power supply 206. Therefore, by selectively controlling each switch 221, the fixed capacitors 228 can be electrically connected or disconnected between the AC power supply 206 and the A-D converter 240 to adjust the capacitance of the adjustable capacitor unit 222, thereby adjusting the output voltage of the voltage decreasing unit. The output voltage from the voltage decreasing unit is adjusted by adjusting the capacitance of the adjustable capacitor unit, thus the speed of the motor can be easily adjusted by a simple and low cost circuit.

The A-D converter 240 is configured to convert the decreased AC voltage output of the voltage decreasing unit 220 to a DC voltage. Preferably, the A-D converter 240 comprises a bridge rectifier circuit.

The energy accumulator 210 comprises a capacitor arranged to be charged by the output of the A-D converter 240 and to supply power directly or indirectly to the electrical load, i.e., the stator windings 208.

The low-voltage generating unit 280 is configured to generate a lower DC voltage from the output DC voltage of the energy accumulator 210. The low-voltage generating unit 280 comprises a resistor and a Zener diode. One end of the resistor is electrically connected with the positive terminal of the capacitor 210, the other end is electrically connected with the cathode of the Zener diode, and the anode of the Zener diode and the negative terminal of the capacitor 210 are electrically connected with ground. Further, a filtering capacitor electrically connected in parallel with the Zener diode may be arranged to make smooth or to stabilize the output of the low-voltage generating unit 280 at the cathode of the Zener diode.

The driving unit 260 comprises a position detecting unit 262, a controller 264 and an inverter 266. The position detecting unit 262 may be a Hall sensor which is powered by the lower DC voltage and configured to detect the position of the rotor of the BLDC motor and output a corresponding position signal. The controller 264 is also powered by the lower DC voltage and configured to respond to the position signal to output a corresponding commutation signal. The controller 264 can be realized by a microcontroller or by a switching circuit constituted by electronic components such as resistor and switch. The inverter 266 is powered by the DC voltage output from the energy accumulator 210 and configured to respond to the commutation signal to control the power to the motor.

The over-voltage protecting unit 230 is configured to carry out over-voltage protection for the DC voltage output from the energy accumulator 210 to prevent electronic components powered by the DC voltage from being damaged. The over-voltage protecting unit 230 comprises a detecting unit 232 and a second switching unit 234. The detecting unit 232 is configured to detect the DC voltage at the output terminal of the energy accumulator 210 and to produce a detecting signal indicating whether the detected DC voltage exceeds a predetermined threshold value.

The second switching unit 234 is configured to be conductive (closed) to lower the DC voltage at the output terminal of the A-D converter 240 to a voltage which is less than the threshold voltage when the detecting signal indicates that the detected DC voltage exceeds the threshold value, and to be non-conductive (open) to allow the A-D converter to function normally and output a DC voltage for the energy accumulator 210 when the detecting signal indicates that the detected DC voltage is lower than the threshold value. Preferably, the lower voltage is a ground voltage. This can be easily achieved by electrically connecting the second switching unit 234 between the output terminal of the A-D converter 240 and ground.

The first switching unit 250 is electrically connected between the output terminal of the A-D converter 240 and the energy accumulator 210. The first switching unit 250 is configured to be conductive to electrically connect the output of the A-D converter 240 to the input of the energy accumulator 210 when the DC voltage at the output terminal of the energy accumulator 210 is lower than the threshold value and to be non-conductive (open) to electrically disconnect the energy accumulator 210 from the A-D converter 240 when the DC voltage at the output terminal of the energy accumulator 210 is higher than the threshold value. Preferably, the first switching unit 250 is a diode, the anode of which is electrically connected with the output terminal of the A-D converter 240 and the cathode of which is electrically connected with the positive terminal of the energy accumulator 210.

The detecting unit 232 detects the output voltage of the energy accumulator 210. If the output voltage of the energy accumulator 210 exceeds the predetermined threshold value, the second switching unit 234 is made conductive and the output voltage of the A-D converter 240 is reduced, preferably to 0 volts. As a result, the output voltage of the energy accumulator 210 is higher than the output voltage of the A-D converter 240, the first switching unit 250 electrically disconnects the A-D converter 240 from the energy accumulator 210, and the energy accumulator 210 supplies power to the motor from the stored energy. With the stored energy of the energy accumulator 210 being consumed, the output voltage of the energy accumulator 210 decreases. When the detecting unit 232 detects the output voltage of the energy accumulator 210 is lower than the threshold value, the second switching unit 234 is opened. As a result, the output voltage of the A-D converter 240 is higher than the output voltage of the energy accumulator 210, the first switching unit 250 electrically connects the A-D converter 240 to the energy accumulator 210, and the energy accumulator 210 is charged by the output of the A-D converter 240 and supplies power to the motor. Thus, the output voltage of the energy accumulator 210 can be kept basically stable relative to the threshold value, over-voltage protection can be realized and the reliability of the circuit can be improved. Besides, as electronic components with relatively lower voltage-resistant grade could be used in the circuit powered by the AC voltage output from the voltage decreasing unit, the circuit cost could also be lowered.

In embodiments of the present invention, the A-D converter 240, the energy accumulator 210, the driving unit 260, the over-voltage protecting unit 230 and the low-voltage generating unit 280 may be arranged on a single printed circuit board, and the adjustable capacitor unit 222 may be mechanically independent from the printed circuit board but electrically connected with the printed circuit board. Also, while the threshold voltage may be any desired value, it is preferred that the threshold voltage is substantially equal to the nominal voltage of the input terminal. The nominal voltage is the desired normal operating voltage, i.e., the design value of the output voltage of the A-D converter.

In the description and claims of the present application, each of the verbs "comprise", "include", "contain" and "have", and variations thereof, are used in an inclusive sense, to specify the presence of the stated item but not to exclude the presence of additional items.

Although the invention is described with reference to one or more preferred embodiments, it should be appreciated by those skilled in the art that various modifications are possible. Therefore, the scope of the invention is to be determined by reference to the claims that follow.

The invention claimed is:
1. A control circuit comprising:
an input terminal for receiving an input voltage;

an energy accumulator for storing electric energy from the input terminal and supplying power to an electrical load;
a first switching unit arranged between the input terminal and the energy accumulator;
a converter for converting an AC voltage to a DC voltage to be supplied to the input terminal;
a low-voltage generating unit arranged between the energy accumulator and the electrical load for generating a lower DC voltage from an output DC voltage of the energy accumulator; and
an over-voltage protection unit for lowering the voltage at the input terminal when the voltage at an output terminal of the energy accumulator exceeds a predetermined threshold value, the over-voltage protecting unit comprising:
a detecting unit which is configured to detect the voltage at the output terminal of the energy accumulator and produce a detecting signal indicating whether the detected voltage exceeds the threshold value; and
a second switching unit which is electrically connected between the input terminal and a voltage less than the threshold value and is configured to be conductive when the detecting signal indicates the detected voltage exceeds the threshold value and to be non-conductive when the detecting signal indicates the detected voltage is lower than the threshold value,
wherein if the output voltage of the energy accumulator exceeds the threshold value, the second switching unit is made conductive and the voltage at the input terminal is reduced; as a result, the output voltage of the energy accumulator is higher than the voltage at the input terminal, the first switching unit electrically disconnects the input terminal from the energy accumulator, and the energy accumulator supplies power to the electrical load from the stored energy; with the stored energy of the energy accumulator being consumed, the output voltage of the energy accumulator decreases; when the detecting unit detects the output voltage of the energy accumulator is lower than the threshold value, the second switching unit is opened; as a result, the voltage at the input terminal is higher than the output voltage of the energy accumulator, the first switching unit electrically connects the input terminal to the energy accumulator, and the energy accumulator is charged by the current from the input terminal and supplies power to the electrical load, and
wherein the energy accumulator comprises a capacitor and the low-voltage generating unit comprises a resistor and a Zener diode; one end of the resistor is electrically connected with the positive terminal of the capacitor, the other end is electrically connected with the cathode of the Zener diode, and the anode of the Zener diode and the negative terminal of the capacitor are electrically connected with ground.

2. The control circuit of claim 1, wherein the first switching unit is a diode, the anode of which is electrically connected to the input terminal.

3. The control circuit of claim 1, wherein the second switching unit is electrically connected between the input terminal and a ground voltage.

4. The control circuit of claim 1, further comprising a voltage decreasing unit for decreasing a higher AC voltage to a lower AC voltage to be converted by the converter.

5. The control circuit of claim 4, wherein the voltage decreasing unit comprises an adjustable capacitor unit with adjustable capacitance.

6. The control circuit of claim 1, wherein the energy accumulator comprises a capacitor.

7. A motor device comprising a motor and a control circuit, wherein the control unit comprises:
an input terminal arranged to receive an input voltage;
an energy accumulator for storing electric energy from the input terminal and supplying power to the motor;
a first switching unit arranged between the input terminal and the energy accumulator;
a converter for converting an AC voltage to a DC voltage to be supplied to the in u terminal;
a low-voltage generating unit arranged between the energy accumulator and the electrical load for generating a lower DC voltage from an output DC voltage of the energy accumulator;
a driving unit comprising a position detecting unit, a controller and an inverter; and
an over-voltage protection unit for lowering the voltage at the input terminal when the voltage at an output terminal of the energy accumulator exceeds a predetermined threshold value, the over-voltage protecting unit comprising:
a detecting unit which is configured to detect the voltage at the output terminal of the energy accumulator and produce a detecting signal indicating whether the detected voltage exceeds the threshold value; and
a second switching unit which is electrically connected between the input terminal and a voltage less than the threshold value and is configured to be conductive when the detecting signal indicates the detected voltage exceeds the threshold value and to be non-conductive when the detecting signal indicates the detected voltage is lower than the threshold value,
wherein if the output voltage of the energy accumulator exceeds the threshold value, the second switching unit is made conductive and the voltage at the input terminal is reduced; as a result, the output voltage of the energy accumulator is higher than the voltage at the input terminal, the first switching unit electrically disconnects the input terminal from the energy accumulator, and the energy accumulator supplies power to the motor from the stored energy; with the stored energy of the energy accumulator being consumed, the output voltage of the energy accumulator decreases; when the detecting unit detects the output voltage of the energy accumulator is lower than the threshold value, the second switching unit is opened; as a result, the voltage at the input terminal is higher than the output voltage of the energy accumulator, the first switching unit electrically connects the input terminal to the energy accumulator, and the energy accumulator is charged by the current from the input terminal and supplies power to the motor, and
wherein the position detecting unit is powered by the lower DC voltage and configured to detect the position of the rotor of the motor and output a corresponding position signal; the controller is also powered by the lower DC voltage and configured to respond to the position signal to output a corresponding commutation signal; the inverter is powered by the DC voltage output from the energy accumulator and configured to respond to the commutation signal to control the power to the motor.

8. The motor device of claim 7, wherein the control unit further comprises a voltage decreasing unit for decreasing a higher AC voltage to a lower AC voltage to be converted by the converter.

9. The motor device of claim 8, wherein the voltage decreasing unit comprises an adjustable capacitor unit with adjustable capacitance.

10. The motor device of claim 7, wherein the motor is a brushless direct current motor.

11. The motor device of claim 7, wherein the predetermined threshold value is essentially equal to the nominal voltage at the input terminal.

12. The motor device of claim 7, wherein the second switching unit is electrically connected between the input terminal and a ground voltage.

13. The control circuit of claim 1, wherein a filtering capacitor electrically connected in parallel with the Zener diode is arranged to make smooth or to stabilize the output of the low-voltage generating unit at the cathode of the Zener diode.

* * * * *